United States Patent
Berberich et al.

(10) Patent No.: US 10,625,254 B2
(45) Date of Patent: Apr. 21, 2020

(54) METHOD FOR CONTROLLING A PIPETTING DEVICE

(71) Applicant: BRAND GMBH + CO KG, Wertheim (DE)

(72) Inventors: Christian Berberich, Neunkirchen (DE); Steffen Gehrig, Walldürn (DE); Wolfgang Ettig, Külsheim (DE); Benjamin Peszleg, Wertheim (DE); Burkhard Schaub, Eussenheim (DE)

(73) Assignee: BRAND GMBH + CO KG, Wertheim (DE)

( * ) Notice: Subject to any disclaimer, the term of this patent is extended or adjusted under 35 U.S.C. 154(b) by 20 days.

(21) Appl. No.: 16/198,354

(22) Filed: Nov. 21, 2018

(65) Prior Publication Data

US 2019/0151840 A1     May 23, 2019

(30) Foreign Application Priority Data

Nov. 22, 2017 (DE) .................... 10 2017 127 557
Nov. 22, 2017 (EP) .................... 17202965

(51) Int. Cl.
*B01L 3/00* (2006.01)
*B01L 3/02* (2006.01)
*G01N 35/10* (2006.01)

(52) U.S. Cl.
CPC ........ *B01L 3/0237* (2013.01); *G01N 35/1016* (2013.01); *G01N 35/1072* (2013.01); *B01L 2200/0605* (2013.01); *B01L 2200/143* (2013.01); *B01L 2200/148* (2013.01); *B01L 2300/0861* (2013.01); *B01L 2300/123* (2013.01); *B01L 2400/0481* (2013.01); *G01N 2035/1023* (2013.01)

(58) Field of Classification Search
CPC ............. B01L 3/0237; B01L 2200/143; B01L 2200/0605; B01L 2200/148; G01N 35/1016; G01N 35/1072
USPC ...................................... 73/863.02
See application file for complete search history.

(56) References Cited

U.S. PATENT DOCUMENTS

| 5,588,963 A | 12/1996 | Roelofs |
| 5,856,200 A | 1/1999 | Krause et al. |
| 8,071,049 B2 | 12/2011 | Koltay et al. |
| 2002/0021222 A1 | 2/2002 | Howitz et al. |
| 2004/0037749 A1 | 2/2004 | Woodward |

(Continued)

FOREIGN PATENT DOCUMENTS

| DE | 102010035599 A1 | 3/2012 |
| DE | 202014006241 U1 | 11/2015 |

(Continued)

*Primary Examiner* — Jamel E Williams
(74) *Attorney, Agent, or Firm* — David S. Safran; Roberts Calderon Safran & Cole, P.C.

(57) ABSTRACT

A method for calibrating and controlling a pipetting device for metered liquid with a multichannel, automated micrometering unit. All of the channels of the pipetting device are calibrated using a camera which detects the expelled droplets of the liquid, so that the volume thereof can be determined by means of a control device. The method makes it possible to carry out a calibration of the individually dispensed liquid volumes in droplet form to a prescribed volume deviation with a different number of possibly necessary repetitions for each individual channel.

10 Claims, 11 Drawing Sheets

(56) References Cited

U.S. PATENT DOCUMENTS

| | | |
|---|---|---|
| 2008/0083263 A1 | 4/2008 | Phillip et al. |
| 2009/0033934 A1 | 2/2009 | Katou et al. |
| 2013/0327787 A1 | 12/2013 | Koltay et al. |
| 2015/0050719 A1 | 2/2015 | Bammesberger et al. |
| 2016/0067705 A1* | 3/2016 | Gehrig .................. B01L 3/022 73/864.11 |
| 2019/0011474 A1 | 1/2019 | Ewoniuk et al. |

FOREIGN PATENT DOCUMENTS

| | | |
|---|---|---|
| WO | 9724528 A2 | 7/1997 |
| WO | 2013167594 A1 | 11/2013 |

* cited by examiner

METHOD FOR CONTROLLING A PIPETTING DEVICE

FIELD OF THE INVENTION

The present invention relates to a method for controlling a pipetting device for metered liquid with a multichannel, automated micrometering unit, the pipetting device having:
- an air-cushion piston-stroke pipette with, for each channel, a cylinder-piston unit with a metering chamber with a volume of air which can be varied by moving the piston and a coupling location, which is flow-connected to the metering chamber and at which a pipette tip having a radially elastically deformable expulsion end can be coupled, in particular can be fitted on,
- a micrometering unit with, for each channel, an actuator which can be set in at least one parameter and
- an electronic control device, wherein the piston-stroke pipette is movable, optionally on its own or together with the micrometering unit, into various operating positions, with the following method steps:
- a) in a pipette tip pick-up position, a pipette tip is coupled at each coupling location of the piston-stroke pipette;
- b) the piston-stroke pipette is moved into a liquid take-up position;
- c) in the liquid take-up position, the pipette tips are immersed with their expulsion ends into liquid which is located in at least one storage vessel, and liquid is sucked into the pipette tips by a movement of the pistons of the cylinder-piston units that is controlled by the control device;
- d) the piston-stroke pipette is moved into a coupling position;
- e) in the coupling position, the piston-stroke pipette is coupled to the micrometering unit in such a way that an expulsion end of a pipette tip is in each case positioned in front of an actuator of the micrometering unit; and
- f) in the coupling position or in a liquid dispensing position, to which the piston-stroke pipette has been moved together with the micrometering unit, the actuators are activated from the control device and the expulsion ends of the pipette tips are individually radially deformed by the actuators respectively assigned to them, so that part of the liquid located in the respective expulsion end is expelled in droplet form.

The present case concerns a method for controlling a multichannel pipetting device with an air-cushion piston-stroke pipette with, for each channel, a cylinder-piston unit, a connected coupling location and a pipette tip coupled at the coupling location.

In principle, a pipetting device may have a single-channel air-cushion piston-stroke pipette with a coupling location and a single pipette tip. However, it is usually a multichannel pipetting device, in which the pipetting unit, in particular therefore the air-cushion piston-stroke pipette, therefore has a number of coupling locations and a corresponding number of pipette tips that can be coupled at these coupling locations. Such a multichannel pipetting device is often used on an automated pipetting machine or pipetting robot.

DESCRIPTION OF RELATED ART

The general background for a pipetting device of the type in question is provided by German Utility Model DE 20 2014 006 241 U1 and similar information can be found in U.S. Patent Application Publication 2016/0067705. Its content is significant for the teaching of the present invention as technological background and for a wealth of details in respect of the present invention.

In the case of a typical pipetting device of the type in question, the pipetting unit, in particular therefore the air-cushion piston-stroke pipette, is brought into various operating positions with its drive, by means of a positioning device. The positioning device may be an X/Y/Z moving device. It may also be the arm of a robot, which can be moved largely freely back and forth in space. The prior art provides various suggestions for this.

In the case of a pipetting device of the type in question, the pipette tips are picked up from a tip store at a pick-up position, that is to say coupled at the coupling locations. Then, the pipetting unit is moved by means of the positioning device into a liquid take-up position. For taking up the liquid into the pipette tips, the mouth openings of the pipette tips are immersed into the liquid in corresponding vessels, for example the wells of a microtiter plate.

The liquid take-up takes place by the effect of displacer unit, in particular a cylinder-piston unit, in the pipetting unit. After the liquid take-up, the pipetting unit is moved by means of the positioning device into a liquid dispensing position. There, again by means of the effect of the displacer unit, the desired liquid volume is again dispensed from the respective pipette tip into a target vessel or a residual liquid in the pipette tips is expelled. Following the dispensing of the residual liquid, the pipette unit is brought into a pipette tip discarding position. There, the pipette tips are detached from the coupling locations on the pipetting unit and discarded into a collecting container by means of a tip discarding device.

U.S. Patent Application Publication 2016/0067705 is concerned with the dispensing of volumes from pipette tips down to the nanoliter range. A pipette tip with an elastically deformable tube at the expulsion end forms the mouth opening of the pipette tip at the lower end. This elastically deformable tube can be deformed by a movable actuating device of a micrometering unit in such a way that a defined volume of liquid is specifically expelled as freely flying droplets from the mouth opening of the pipette tip by deformation of the tube just above the mouth opening of the pipette tip.

In International Patent Application Publication WO 2006/076957 A1 and corresponding U.S. Pat. No. 8,071,049, the micrometering unit of the pipetting device is fixedly located at the liquid dispensing position.

The structural design in the case of U.S. Patent Application Publication 2016/0067705 is distinguished by the fact that the micrometering unit is configured as a unit separate from the pipetting unit. This means that the pipetting unit can be used in various relevant operating positions. Then, the micrometering unit is coupled to the pipetting unit, to be precise in an exactly defined relative position in relation to the pipetting unit, when it is needed, that is to say in the liquid dispensing position.

After the coupling, the micrometering unit together with the pipetting unit can be brought by means of the positioning device into various operating positions, for example also into a number of different liquid dispensing positions.

It is known from further prior art (International Patent Application Publication WO 2013/167594 A1 and corresponding U.S. Patent Application Publication 2015/0050719), to use a pipette tip with a radially deformable expulsion end to detect the meniscus of the metered liquid in the expulsion end by means of a meniscus detector. The meniscus detector may be a camera arrangement.

In order that the desired volume of liquid can be precisely dispensed from the respective pipette tip into a target vessel by means of the effect of the displacer unit in the respective operating phase of the pipetting device, prior calibration of the pipetting device is required. The calibration of the pipetting device, like the entire operation of the pipetting device too, requires controlling of the pipetting device.

SUMMARY OF THE INVENTION

The invention addresses the problem of optimizing the calibration of the multi-channel pipetting device in question. An optimization suitable for this is also to be performed during the working phases of the pipetting device.

The problem presented above is solved as described herein.

In the case of the present the invention having steps a) to f) above, the method is also characterized by the following further method steps:
  g) individually for each channel, the droplet expelled in method step f) is detected by a camera aligned radially with the expulsion end of the pipette tip in the image section of the camera and the data of the detected image are transmitted to the control device;
  h) the control device determines the volume value of the droplet concerned under the assumption of a rotational symmetry of the droplet;
  i) the volume value determined in method step h) is compared with a setpoint volume value and, depending on the volume deviation thereby determined, the actuator assigned to the channel concerned is adjusted in the direction of an approach to the setpoint volume value;
  j1) method steps f) to i) are repeated for each channel and, when doing so, the volume values successively determined for the channel are accumulated and the accumulated volume value is compared with a sequence volume value prescribed in the control device;
  k1) the repetitions according to feature j1) are ended in the case of the channels for which the accumulated volume value has approached the sequence volume value to within a difference in volume which is smaller than the last determined volume value, or has reached the sequence volume value or exceeded it for the first time;
  l1) after method step k1), for the channel concerned, the piston of the cylinder-piston unit concerned, activated by the control device, is moved in such a way that the volume of air of the metering chamber is reduced and so the loss of liquid from the pipette tip is neutralized to the extent of the accumulated volume value or the sequence volume value in the expulsion end; and
  m1) method steps f) to l1) are repeated until the determined volume value in each channel lies within a prescribed tolerance range around the setpoint volume value or at the longest until all of the accumulated volume values from method step j1) correspond to the liquid volume sucked up in method step c) less a residual volume.

The adjustment in the direction of an approach to the setpoint volume value is to be understood as follows: If the volume value determined in method step h) is smaller than the volume setpoint value, then the actuator assigned to the channel concerned is adjusted such that the volume value of the droplet expelled next is greater than the determined volume value of the previously expelled droplet. If the volume value determined in method step h) is greater than the volume setpoint value, then the actuator assigned to the channel concerned is adjusted such that the volume value of the droplet expelled next is smaller than the determined volume value of the previously expelled droplet. The extent of the adjustment is in both cases depending on the determined volume deviation. If the volume value determined in method step h) matches the volume setpoint value, including a prescribed tolerance range, then the actuator assigned to the channel concerned is not adjusted.

In method step k1) the repetitions according to feature j1) are ended for those channels whose accumulated volume value"
  has reached or exceeded for the first time a threshold, which is smaller by a difference in volume, which is smaller than the last determined volume value, than the sequence volume value or
  has reached the sequence volume value or
  has exceeded the sequence volume value for the first time.

In the case of the method according to the invention, all of the channels of the pipetting device are calibrated. Each channel with the respectively coupled individual pipette tip may require a different setting of the actuator. Different liquids also require a specific setting. This method makes it possible in the case of a multichannel pipetting device to carry out a calibration of the individually dispensed liquid volumes in droplet form to a setpoint volume value within a prescribed tolerance range with a different number of required repetitions of the individual channels.

In a preferred method step n1), the volume value last determined in method step i) in each channel lies within a prescribed tolerance range around the setpoint volume value. Here, after method step l1), droplets are dispensed into assigned target vessels with the previously achieved setting of the actuators from the pipette tips of the channels, controlled by the control device, to be precise in the coupling position or in a liquid dispensing position previously adopted by the piston-stroke pipette together with the micrometering unit.

In the preferred method step n1), it is advantageous if the dispensing of droplets is interrupted when approaching the sequence volume value corresponding to feature k1) and the loss of liquid is neutralized by method step l1). With these method steps, a dispensing of liquid in another target vessel or at another location is defined. The condition prescribed in the calibration in method step l1) is still required for dispensing an exact volume.

The condition "when approaching the sequence volume value corresponding to feature k1)" is fulfilled as soon as the accumulated volume value of the respective channel has reached or exceeded a threshold which is smaller by a difference in volume, which is smaller than the last determined volume value, than the sequence volume value.

Assuming the same features, a) to f) noted at the outset above, a variant of the method in accordance with the invention is characterized by the following further method steps:
  g) individually for each channel, the droplet expelled in method step f) is detected by a camera aligned radially with the expulsion end of the pipette tip in the image section of the camera and the data of the detected image are transmitted to the control device;
  h) the control device determines the volume value of the droplet concerned under the assumption of a rotational symmetry of the droplet;
  i) the volume value determined in method step h) is compared with a setpoint volume value and, depending on the volume deviation thereby determined, the actuator assigned to the channel concerned is adjusted in the direction of an approach to the setpoint volume value;

j4) method steps f) to i) are repeated for each channel, to be precise until the volume value in the respective channel lies within a prescribed tolerance range around the setpoint volume value;

k4) for each channel, the successively determined volume values are accumulated;

l4) the accumulated volume values of the channels are compared;

m4) the highest accumulated volume value of all of the channels is determined;

n4) apart from in the case of the channel with the highest accumulated volume value, method step f) or method steps f) to i) is/are repeated in the case of the other channels until in the respective channel the accumulated volume value corresponds to the highest accumulated volume value to within a difference in volume which is smaller than the last determined volume value of the channel; and o4) after method step n4), each piston of the cylinder-piston unit, activated by the control device, is moved in the dispensing direction in such a way that the volume of air of the metering chamber is reduced and so the loss of liquid from the pipette tip is neutralized to the extent of the accumulated volume value for each channel, the highest accumulated volume value or the mean value of all of the accumulated volume values in the expulsion end.

In the case of the method according to the invention, the same advantageous effect is achieved as described above. Under special conditions, in particular an unfavorable ratio of a very small droplet volume to a still possible movement step of the piston, or in the case of a greater admissible volume deviation, with these method steps the required time for calibrating the channels can be shortened.

In a preferred method step p4) after method step l4), droplets are dispensed into assigned target vessels with the previously achieved setting of the actuators from the pipette tips of the channels, controlled by the control device, to be precise in the coupling position or in a liquid dispensing position previously adopted by the piston-stroke pipette together with the micrometering unit.

In the preferred method step p4), it is advantageous that the dispensing of droplets in the liquid dispensing position is interrupted when approaching the highest accumulated volume value corresponding to feature m4), or a prescribed sequence volume value and the loss of liquid is neutralized by method step o4). With these method steps, a dispensing of liquid in another target vessel or at another location is defined. The condition prescribed in the calibration in method step o4) is still required for dispensing an exact volume.

The condition "when approaching the highest accumulated volume value corresponding to feature m4), or a prescribed sequence volume value" is fulfilled as soon as the accumulated volume value of the respective channel has reached or exceeded a threshold which is smaller by a difference in volume, which is smaller than the last determined volume value, than the highest accumulated volume value or the prescribed sequence volume value.

It is of advantage if method step l1) or o4) is carried out for all of the cylinder-piston units simultaneously. Simultaneous implementation, particularly by means of a common drive for all of the pistons, saves time.

The problem presented above is solved in a further variant in the case of a method coinciding in principle for calibrating and controlling a pipetting device for metered liquid with the features of the characterizing part of Claim 8. To this extent, preferred refinements and developments are the subject of Claims 9 and 10.

The variant of the present invention last referred to concerns the following further method steps:

g) individually for each channel, the droplet expelled in method step f) is detected by a camera aligned radially with the expulsion end of the pipette tip in the image section of the camera and the data of the detected image are transmitted to the control device;

h) the control device determines the volume value of the droplet concerned under the assumption of a rotational symmetry of the droplet;

i) the volume value determined in method step h) is compared with a setpoint volume value and, depending on the volume deviation thereby determined, the actuator assigned to the channel concerned is adjusted in the direction of an approach to the setpoint volume value;

j8) method steps f) to i) are repeated for each channel, to be precise until the volume value in the respective channel lies within a prescribed tolerance range around the setpoint volume value;

k8) for each channel, the successively determined volume values are accumulated and the accumulated volume value is compared with a maximum volume value prescribed in the control device, in particular the nominal value of the pipette tip;

l8) the repetitions according to feature j8) are ended for the respective channel as soon as the accumulated volume value corresponds to the maximum volume value to within a difference in volume which is smaller than the volume value last determined in the case of this channel; and m8) after method step l8) for all of the channels, the residual liquid is expelled from all of the pipette tips by means of the cylinder-piston units and the process is restarted as from method step b) or an input by the user is required.

In the case of the method according to the invention, the same advantageous effect is achieved as described above. Under special conditions, such as the droplet volume set to be greater, the maximum available nominal volume of the pipette tip may be limited. Under this possible condition, the present teaching is of advantage.

In the preferred method step n8), it is advantageous if the volume value last determined in method step j8) in each channel lies within a prescribed tolerance range around the setpoint volume value; then, after method step l8), droplets are dispensed into assigned target vessels with the previously achieved setting of the actuators from the pipette tips of the channels, controlled by the control device, to be precise in the coupling position or in a liquid-dispensing position previously adopted by the piston-stroke pipette together with the micrometering unit.

In the preferred method step n8), it is advantageous if the dispensing of droplets in the liquid dispensing position is interrupted when approaching the maximum volume value corresponding to feature l8), or a prescribed sequence volume value and the loss of liquid is neutralized by a method step carried out in a way analogous to method step o4).

The condition "when approaching the maximum volume value corresponding to feature l8), or a prescribed sequence volume value" is fulfilled as soon as the accumulated volume value of the respective channel has reached or exceeded a threshold which is smaller by a difference in volume, which is smaller than the last determined volume value, than the maximum volume value or the prescribed sequence volume value.

With these method steps, a dispensing of liquid in another target vessel or at another location is defined. The individually determined condition prescribed in the calibration in method step o4), the neutralization of the loss of liquid from the pipette tip to the extent of the accumulated volume value for each channel, the highest accumulated volume value or the mean value of all of the accumulated volume values in the expulsion end, is still required for dispensing an exact volume.

Generally, the preferred refinements and developments which can optionally be realized apply to all of the variants of the method according to the invention.

Particularly expedient is a refinement in which the setting of the volume value is ended when a number of repetitions of method steps f) to i) prescribed by the user has been reached. Alternatively, it is appropriate that, depending on the result of the comparison in method step i), method steps f) to 11) or f) to o4) or f) to m8) are repeated up until a switch-off event or point in time, a user input preferably then being required. The user prescribing switching-off conditions allows the calibrating process to be delimited more specifically. It is preferably recommendable after the interruption to call for a user input initiating the further procedure.

It may optionally be provided that method steps j1) and k1) or j4) to n4) or j8) to l8) are not carried out for the channels of the piston-stroke pipette simultaneously, but in a certain sequence one after the other and/or not for all adjacent channels simultaneously, and overall until these method steps have been completed for all of the channels. In this way, uniform light conditions are ensured.

The method according to the invention is even more targeted if, after a change of the liquid and/or after a change of the pipette tips, the control device compares various settings in method step g). It is also recommendable to adapt the point in time of the activation of the actuator and/or of a stroboscope light and/or an image query in the sense of an optimum representation and central position of the droplet to be detected in the image section of the camera.

As far as the determination of the difference in volume that is of significance for the ending of the repetitions (features k1), n4), l8)) is concerned, it should be taken into consideration that a residual volume of liquid that allows the dispensing of droplets by impulses of the actuator in the first place must be contained in the expulsion end.

In the case of the method according to the invention, the actuator may be suitably activated by the control device. It may be recommendable for this that, in method step i), for deforming the expulsion end, the control device sets the point in time of the deformation with respect to the image detection in method step g), the travel of the stroke, the respective dwell time when changing the direction of the stroke, the prestressing displacement and/or the prestressing force of the deformation of the expulsion end, at the expulsion end, the distance between the deformation and the expulsion opening, the angle between the expulsion end and the actuator and/or the dynamics of the respective actuator.

Among the dynamic setting possibilities, the forward acceleration, forward velocity, return acceleration and/or return velocity of the respective actuator in dependence on the volume deviation determined in feature i) and/or on the contour or the position of the droplet offer appropriate possibilities.

With regard to the limiting conditions in the use of the method, the user will prescribe input values to the control device before method step i). The values comprise the tolerance range of the setpoint volume value, the sequence volume value, the residual volume, the metered liquid, data on the metered liquid, the parameters of the settable actuator and/or data or algorithms for adjusting the actuator by the control device. The actuator is preferably only adjusted by the control device whenever the volume deviation is greater than the tolerance range. In addition or as an alternative, while taking into consideration the approach of the volume deviation to the tolerance range, the actuator is changed with respect to a previous method step i, that is to say is not adjusted uniformly.

The method according to the invention can be used in a more targeted manner if, before repeating method step j1) or j4) or j8), for each channel the difference between a sequence volume value and a previous accumulated volume value is determined and the difference is accumulated in the next method step j1) or j4) or j8) as a volume value, as determined in method step h). The previous deviations are consequently taken into consideration in the repetition.

The method according to the invention offers the possibility, particularly in method step e) that, after reaching the coupling position, the expulsion end is vertically aligned and the assigned actuator of the micrometering unit is movable orthogonally thereto and begins to interact radially, preferably at right angles, with the expulsion end of the pipette tip.

With regard to the camera, it is recommendable that, in method step g), the image section is detected as an individual image or is selected as an individual image from a stream of individual images.

It is also of advantage if, in method step g), a lighting device, which is arranged with respect to the camera and illuminates the image section assists the detection of the image in the image section.

It is also recommended that the volume value of the droplet concerned that is determined by the control device in method step h) is determined by comparison of the image detected in method step g) with a stored reference image and/or the contour of the droplet is calculated from the data of the image detected in method step g), in particular that the control device determines the volume value of the droplet concerned from the volume value of the droplet of the reference image found to be suitable, from the calculated contour of the droplet under the assumption of a rotational symmetry of the droplet or from both.

With regard to the drive for the piston, it is recommendable that the sequence volume value or the highest accumulated volume value corresponds to the smallest possible stroke of the cylinder-piston unit. This value optimally lies between 10 and 2000 nl, in particular between 25 and 500 nl.

The invention is explained in more detail below on the basis of the accompanying drawings.

DETAILED DESCRIPTION OF THE INVENTION

First, an explanation is given of the basic concept of a pipetting device of the type in question according to U.S. Patent Application Publication 2016/0067705, which is at the same time the basic concept of a pipetting device according to the present invention. However, it may be stated in advance that the present invention preferably relates to a multichannel pipetting device with an air-cushion piston-stroke pipette, so that FIG. 9 of the drawings is particularly relevant to this prior art.

Figure 1:
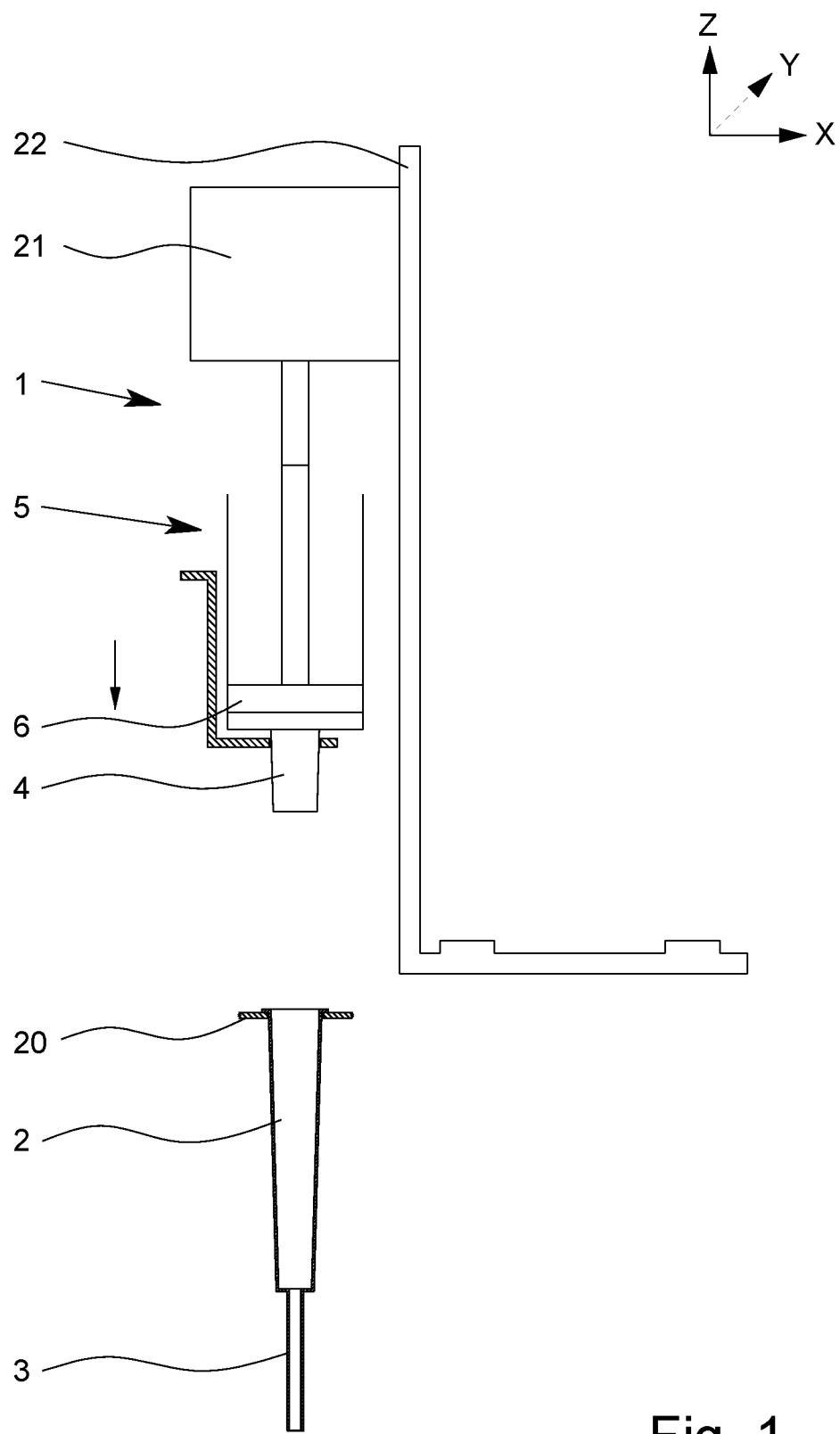
FIG. 1 is a schematic representation of the pipetting device in a pipette tip pick-up position without the micrometering unit.

FIG. 1 shows a pipetting device with an air-cushion piston-stroke pipette 1, referred to hereafter as a piston-stroke pipette. At least one pipette tip 2 can be exchangeably attached to the piston-stroke pipette 1. The pipetting device is such a device with a pipette tip 2, which has an elastically deformable expulsion end 3. In the exemplary embodiment represented, the elastically deformable expulsion end 3 has the form of an elastically deformable tube. Such a tube may have any desired cross section, for example also an elliptical cross section. All variants are possible here.

As FIG. 1 shows, the piston-stroke pipette 1 has, for each attachable pipette tip 2, a coupling location 4 designed as a pipette shaft, to which the open upper end of the pipette tip 2 is fitted in order to couple it. The piston-stroke pipette 1 has at least one channel within the coupling location 4 and a displacer unit 5 flow-connected thereto. The displacer unit 5 here is a cylinder-piston unit.

The displacer unit 5 has a piston 6 which, depending on the direction in which it is driven, produces in the coupled pipette tip 2 a negative pressure for taking up liquid into the pipette tip 2 or a positive pressure for expelling liquid out of the pipette tip 2.

Figure 8:
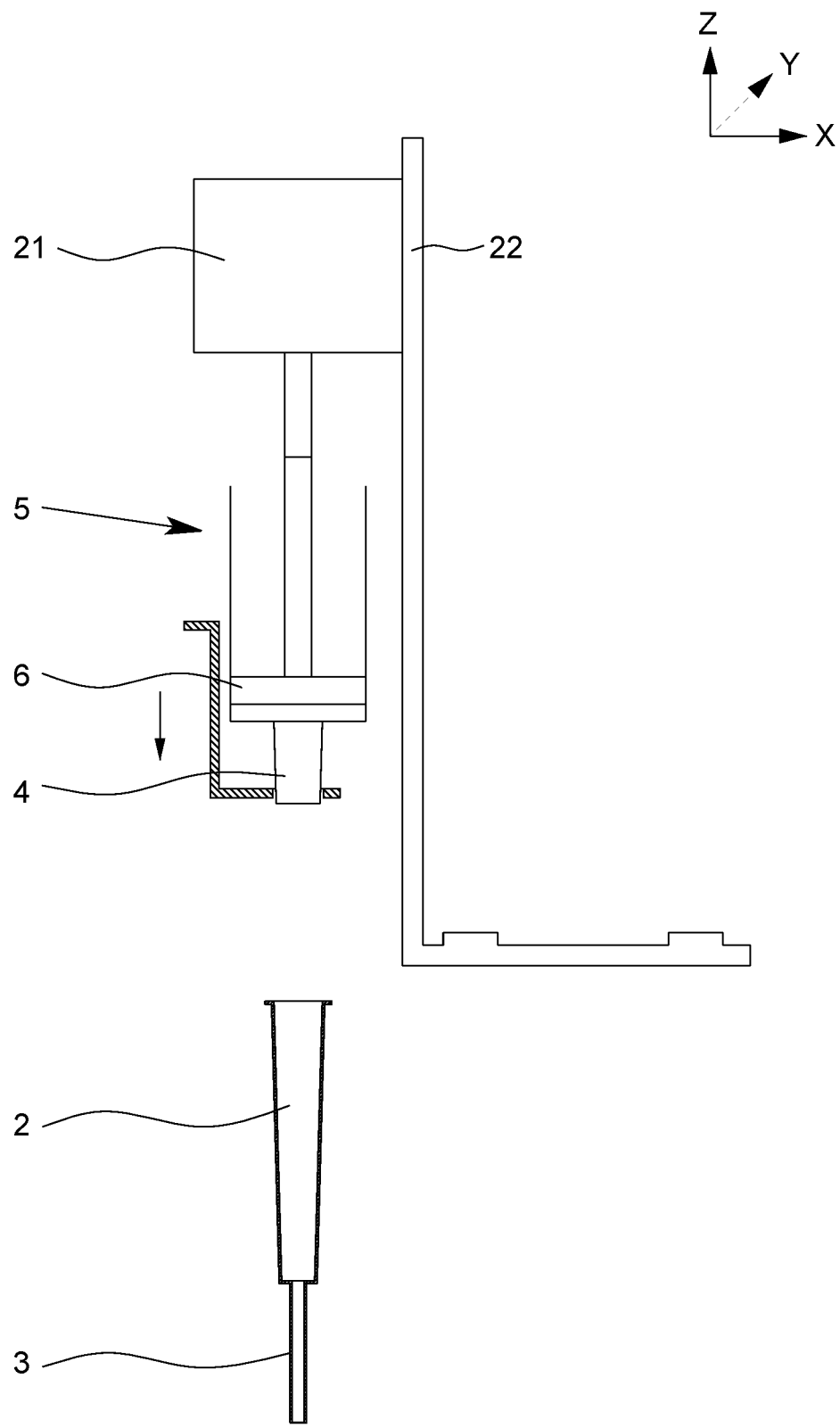
FIG. 8 is a schematic representation of the pipetting device from FIG. 1 in a pipette tip discarding position.

By means of a positioning device that is not represented, controlled by a control device of the pipetting device that is similarly not shown, the piston-stroke pipette 1 can be brought into various operating positions. Typical operating positions are a pipette tip pick-up position (FIG. 1), a liquid take-up position (FIG. 2), a coupling position (FIGS. 3, 4a and 4b), in which a calibration is also performed (FIGS. 5a and 5b), a liquid dispensing position or a plurality of such liquid dispensing positions (FIG. 6), and also a pipette tip discarding position (FIG. 8).

Figure 7:
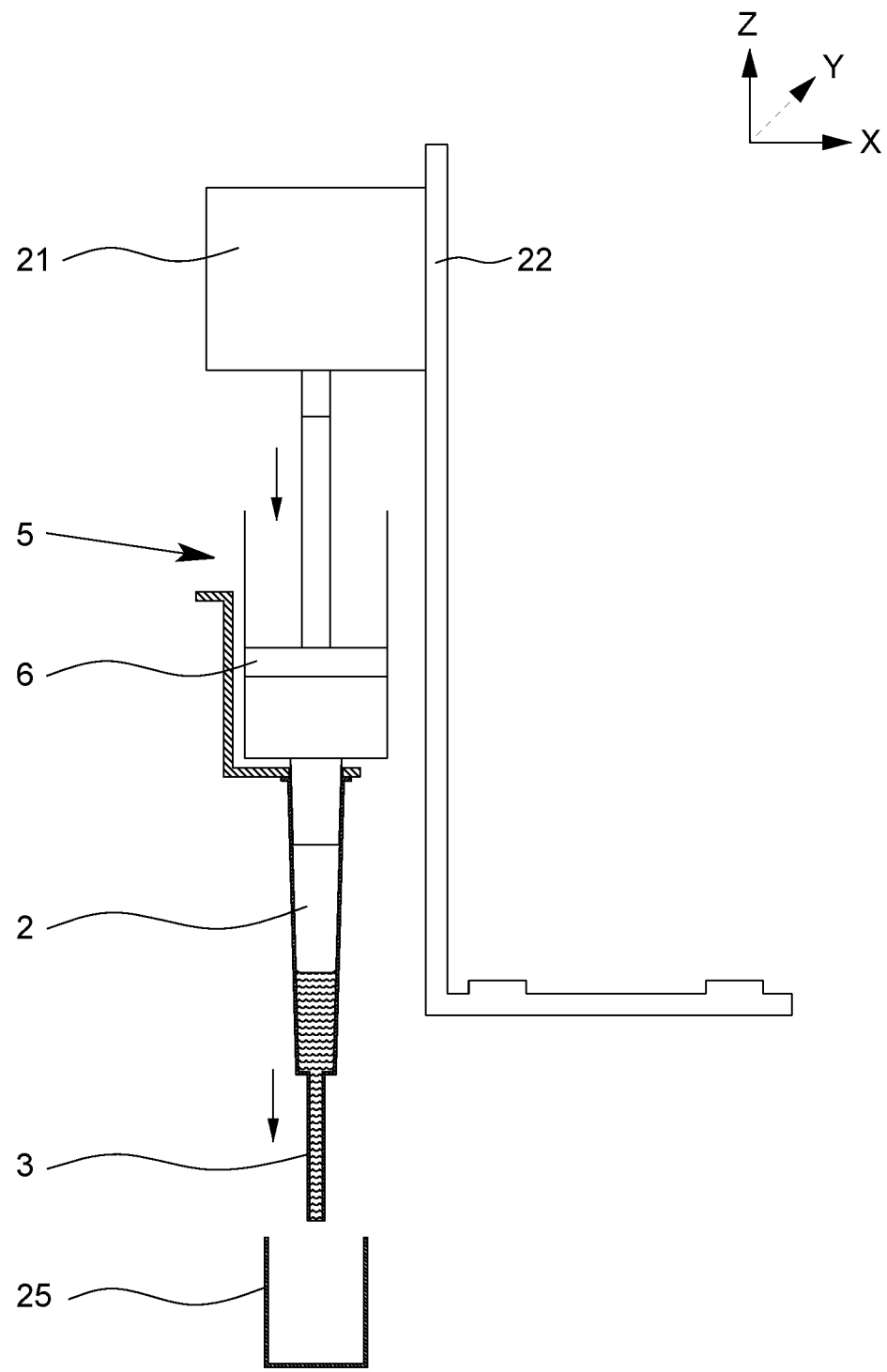
FIG. 7 is a schematic representation of the pipetting device from FIG. 2 in the final dispensing of liquid.

Lying in between, there may also be a residual liquid expulsion position, as represented in FIG. 7. In the residual liquid expulsion position of the piston-stroke pipette 1, residual liquid can be removed from the pipette tips 2 before they are then discarded into a container in the pipette tip discarding position (FIG. 8).

Figure 3:
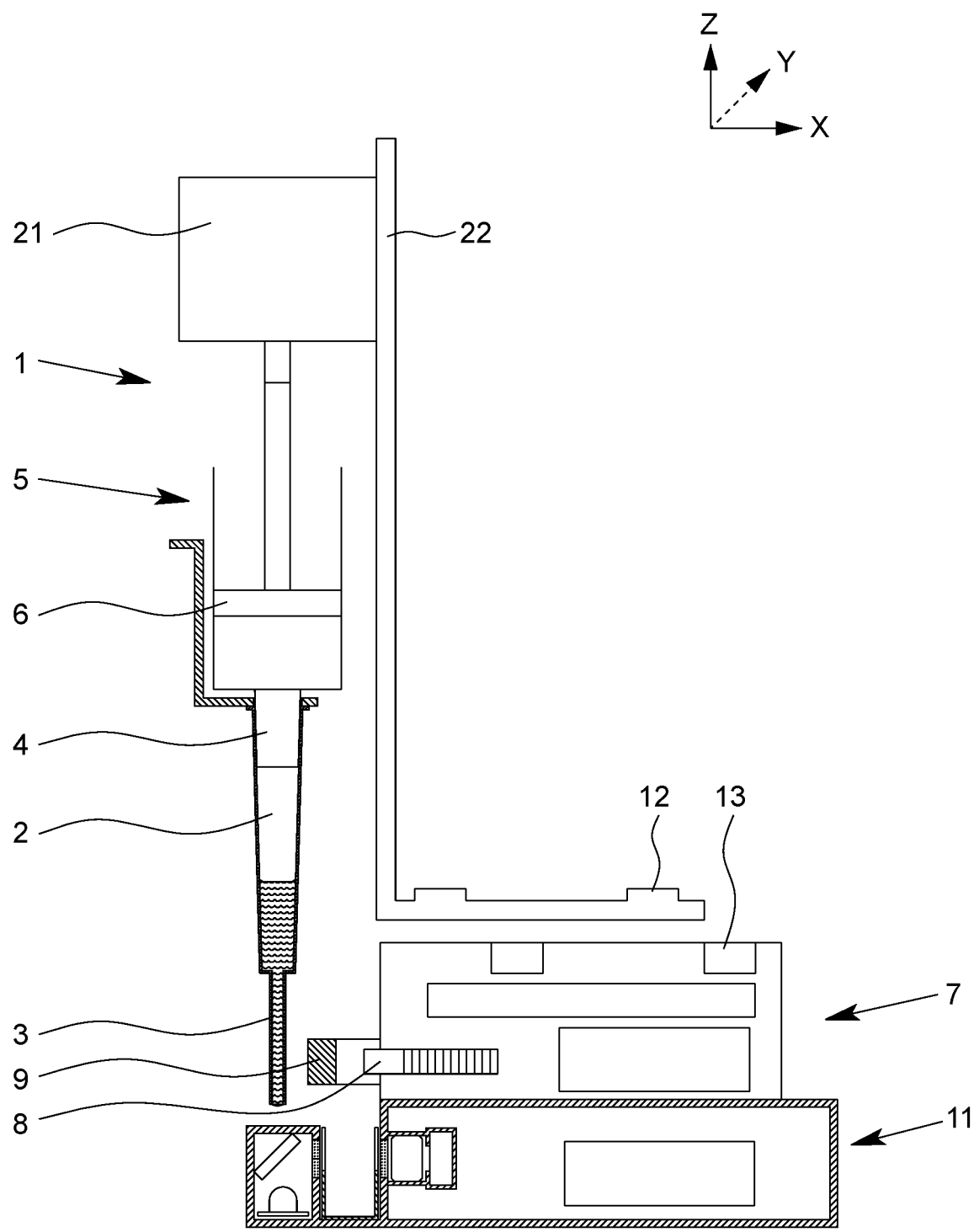
FIG. 3 is a schematic representation of the pipetting device from FIG. 2 with a micrometering unit before a coupling position.
Figure 4A:
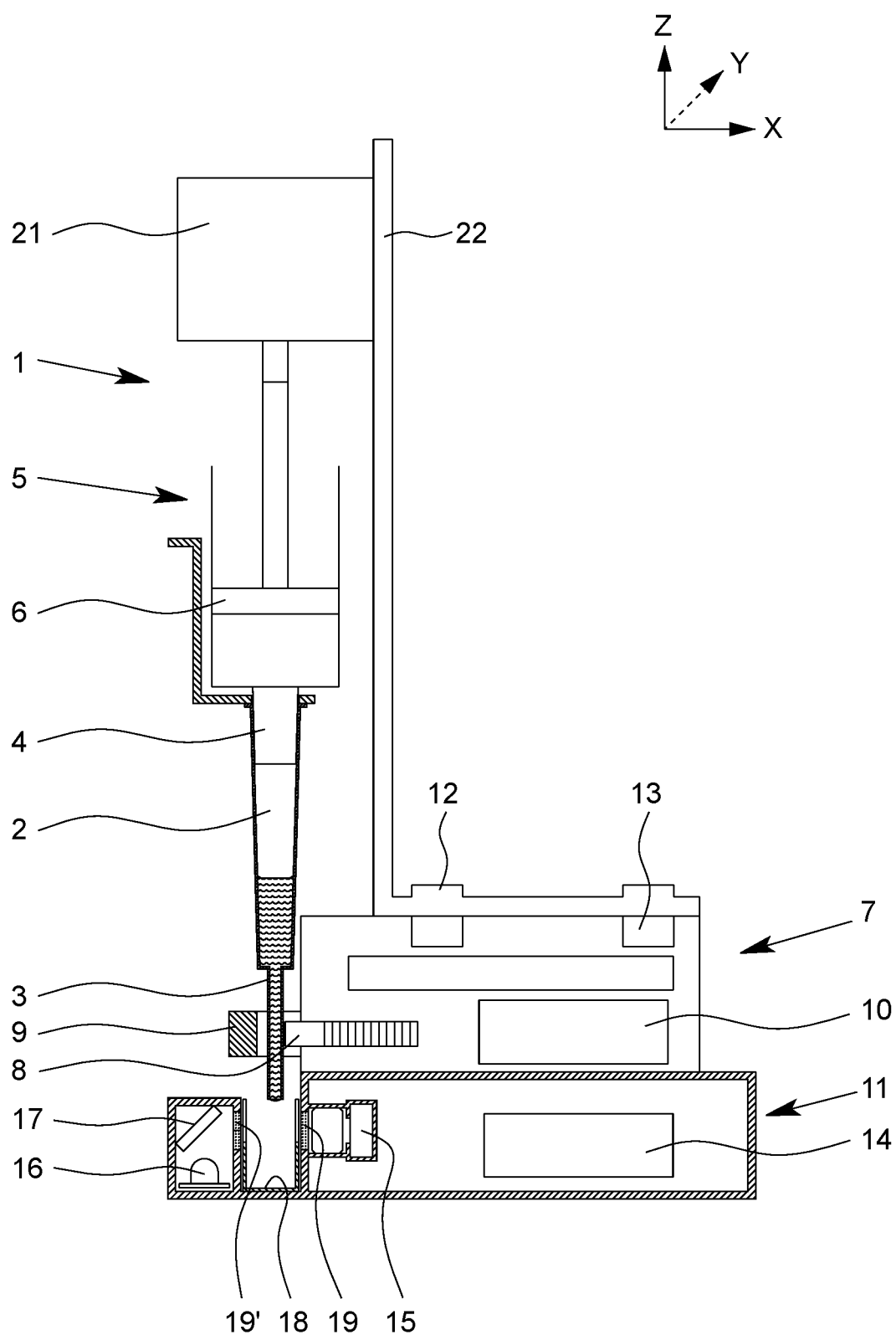
FIG. 4a is a schematic representation of the pipetting device from FIG. 3 with a micrometering unit in a coupling position.
Figure 4B:
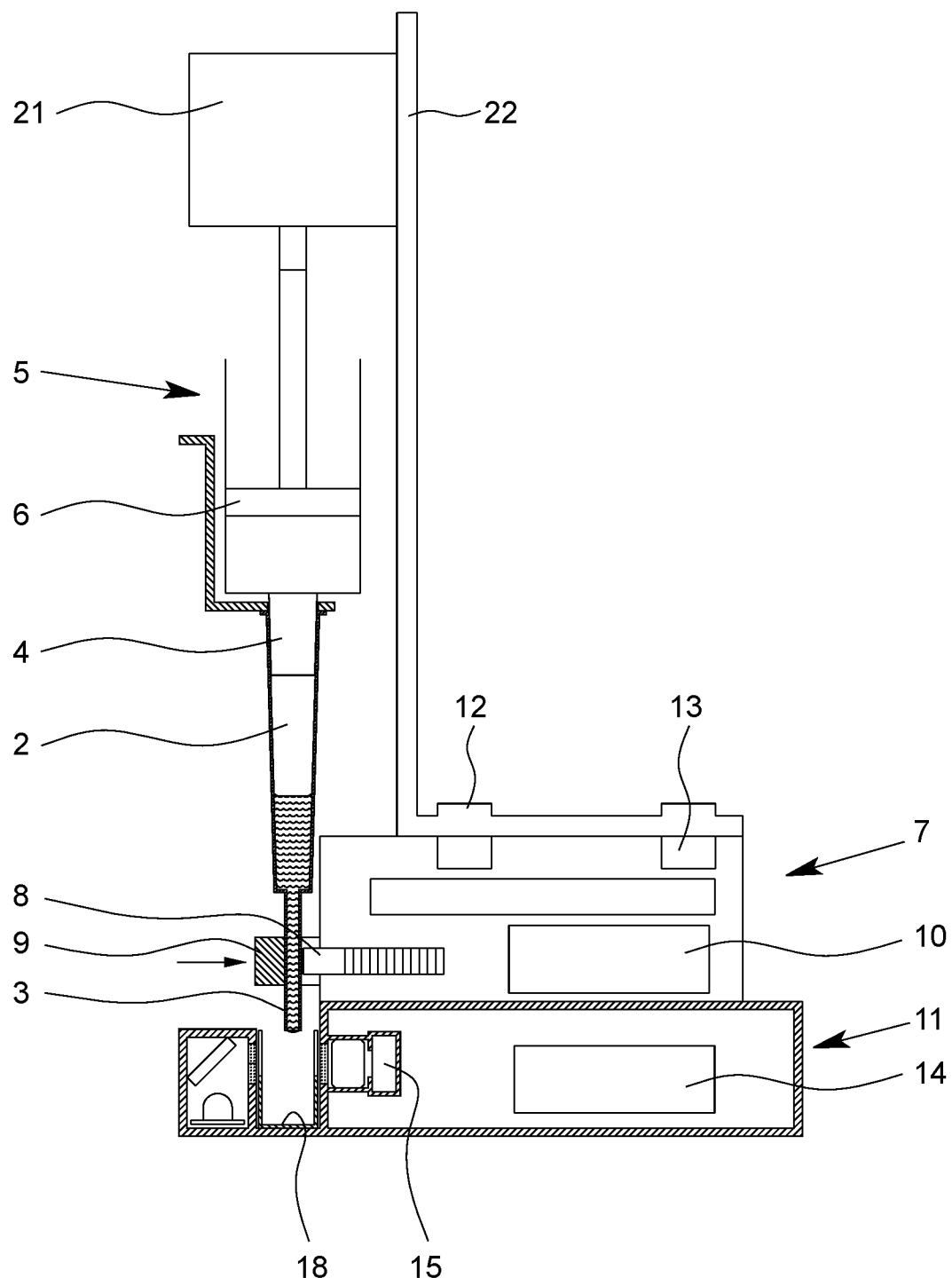
FIG. 4b shows the pipetting device from FIG. 4a in the coupling position after completed coupling.

As FIGS. 3, 4a and 4b show, the piston-stroke pipette 1 is coupled to a micrometering unit 7. The micrometering unit 7 comprises an actuator 8, which can come into force-transmitting engagement with the elastically deformable expulsion end 3 of the pipette tip 2. An abutment 9 serves for fixing the expulsion end 3 of the pipette tip 2. This abutment can be brought up against the expulsion end 3 of the pipette tip 2 by means of a drive (see FIG. 4a at the transition to FIG. 4b). It can be detected by means of the actuator 8 with which prestressing force and/or by means of which prestressing displacement the abutment 9 is moved against the expulsion end 3 of the pipette tip 2. In the exemplary embodiment represented, the actuator 8 begins to interact with the elastically deformable expulsion end 3 of the pipette tip 2, the elastically deformable tube realized in the exemplary embodiment, directly above the mouth opening.

The micrometering unit 7 represented in FIG. 5 is activated here by a control unit 10 of its own. The abutment 9 and the actuator 8 are electrically connected to the control unit 10 and can each be set in at least one parameter.

In FIGS. 3, 4a 4b and 5a it can be seen that, according to a particularly preferred design, the pipetting device has a base station 11 for storing the micrometering unit 7 when it is not in use. The base station 11 has a dedicated, defined place for storing the micrometering unit 7 when it is not in use. It is preferably positioned fixedly on the pipetting device.

In each of FIG. 4a to FIG. 5b, an arrangement of the piston-stroke pipette 1, the micrometering unit 7 and the base station 11 stacked one on top of the other is shown. The piston-stroke pipette 1 is connected to the micrometering unit 7 by means of a coupling device 12 and a counterpart coupling device 13. These devices are arranged in a horizontal plane. The storing place for the micrometering unit 7 on the base station 11 is also oriented in a horizontal plane. A different arrangement in a vertical or inclined plane is similarly possible. Details of such structural designs can be found in U.S. Patent Application Publication 2016/0067705, which is expressly incorporated by reference here.

The base station 11 has furthermore a connection that is not represented for the power supply and for data lines, which are connected to the control device of the pipetting device. Furthermore, the base station 11 has a control device 14, a camera 15 and a lighting system 16, which are electrically connected. In addition, the base station 11 comprises a mirror 17 and the collecting vessel 18. Windows 19, 19' may be arranged in front of the mirror 17 and the camera 15. A further data line may be set up to the micrometering unit 7 and used for passing on signals from the camera 15 and/or the control device 14.

As far as the control-related organization of the pipetting device is concerned, it may be provided that the micrometering unit 7 is largely autonomous in terms of control, it communicating with the control device of the pipetting device and the control device 14 of the base station 11 in a contact-bound or wireless manner. Similarly, the base station 11 may be largely autonomous in terms of control and connected to the control device of the pipetting device in a contact-based manner.

The method according to the invention comprises the method steps explained below.

In FIG. 1, the situation in the pipette tip pick-up position can be seen. The pipette tip 2 is suspended within the rack 20 of a storage container. The displacer unit 5 in the form of a cylinder-piston unit is located together with an associated drive 21 on a mount 22. The drive 21 is connected to a control device of the pipetting device that is not represented.

It is indicated by arrows how the piston-stroke pipette 1 not represented here can be moved by means of the positioning device that is not represented.

Figure 2:
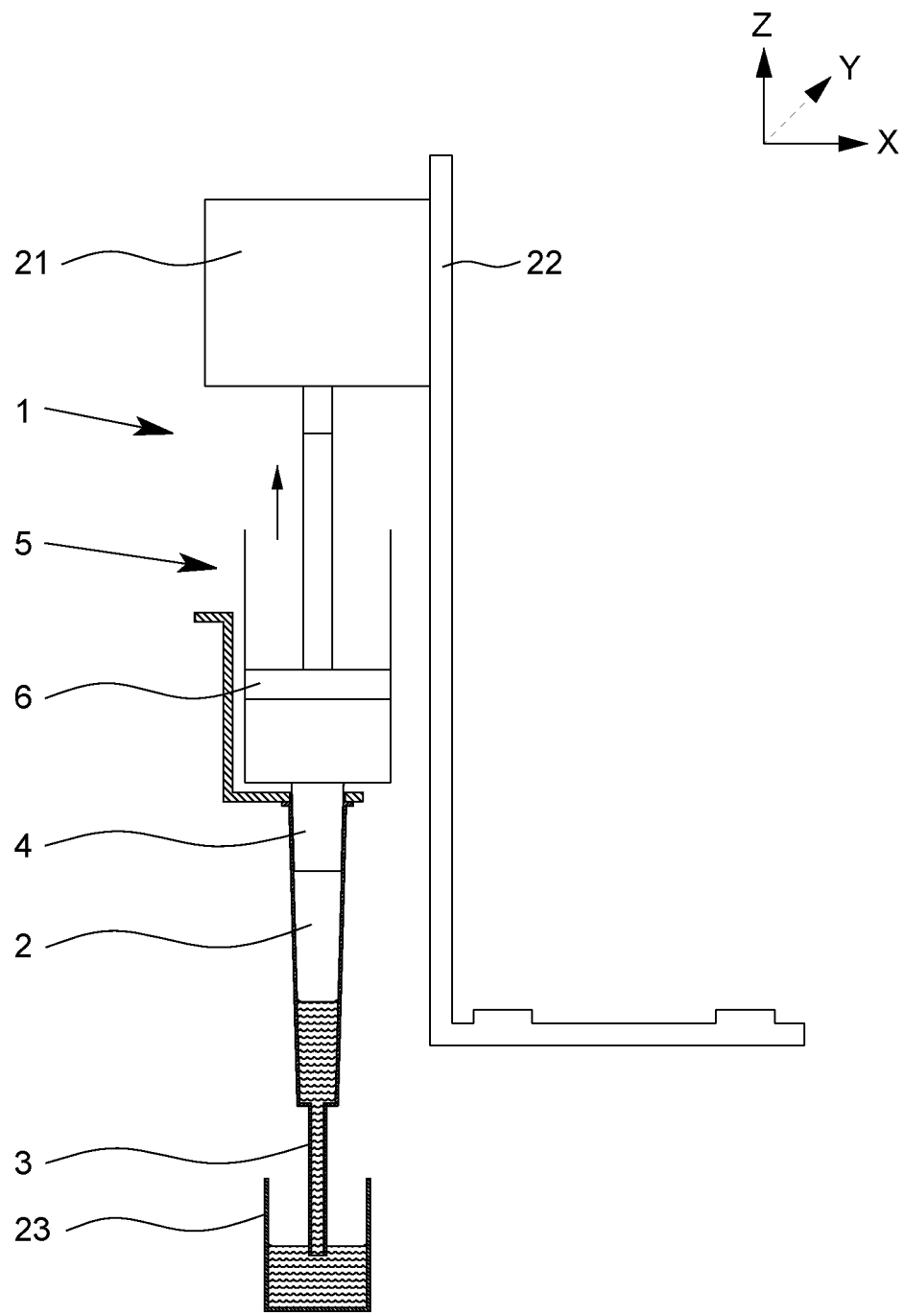
FIG. 2 is a schematic representation of the pipetting device in a liquid take-up position without the micrometering unit.

On the piston-stroke pipette 1 there is a coupling location 4 in the form of a pipette shaft, the conicity of which corresponds to the conicity of the upper end of the pipette tip 2. In FIG. 2, the pipette tip 2 has been fitted onto the coupling location 4, which corresponds to method step a). In FIG. 2, the piston-stroke pipette 1 has been brought into the liquid take-up position by means of the positioning device, which corresponds to method step b). A storage vessel 23, in which there is liquid, can be seen at the bottom. This liquid has just being sucked into the pipette tip 2 by means of the effect of the displacer unit 5 on the basis of the air-cushion principle, which corresponds to method step c). After the sucking up of the liquid and raising of the pipette tip 2 out of the liquid in the storage vessel 23, the piston-stroke pipette 1 can be moved into another operating position.

FIG. 3 shows a representation shortly before the coupling position, which corresponds to method step d).

In FIG. 4a, the piston-stroke pipette 1 has been brought together with the micrometering unit 7, which is located on a base station 11. The base station 11 serves as a fixed storing place for the micrometering unit 7 of the pipetting device. The coupling device 12 on the piston-stroke pipette 1 interacts with the counterpart coupling device 13 in such a way that the micrometering unit 7 is fixedly coupled on the piston-stroke pipette 1. This takes place in a defined relative position. The pipette tip 2 represented in FIG. 4a is located with its expulsion end 3 exactly in front of the actuator 8 of the micrometering unit 7, which corresponds to method step e). On the left in FIG. 4a, an abutment 9 can be seen at the height of the expulsion end 3 of the pipette tip 2. In FIG. 4b, an arrow indicates that the abutment 9 is brought up against the expulsion end 3 of the pipette tip 2.

The coupling is ended as soon as the abutment 9 has been brought up against the expulsion end 3 of the pipette tip 2 with the desired prestressing force and/or over the desired prestressing displacement with a drive of its own. This coupling position is shown in FIG. 4b.

In the coupling position according to FIG. 4b, the conditioning of the piston-stroke pipette 1 is also performed. As an alternative to this, the piston-stroke pipette 1 together with the micrometering unit 7 may also be moved into a liquid take-up position, in which the base station 11 is arranged. For conditioning, the piston 6 of the displacer unit 5 is moved down to the extent to which further liquid was previously sucked up, so that a meniscus of the liquid located in it forms at the mouth opening of the expulsion end 3.

Figure 5A:
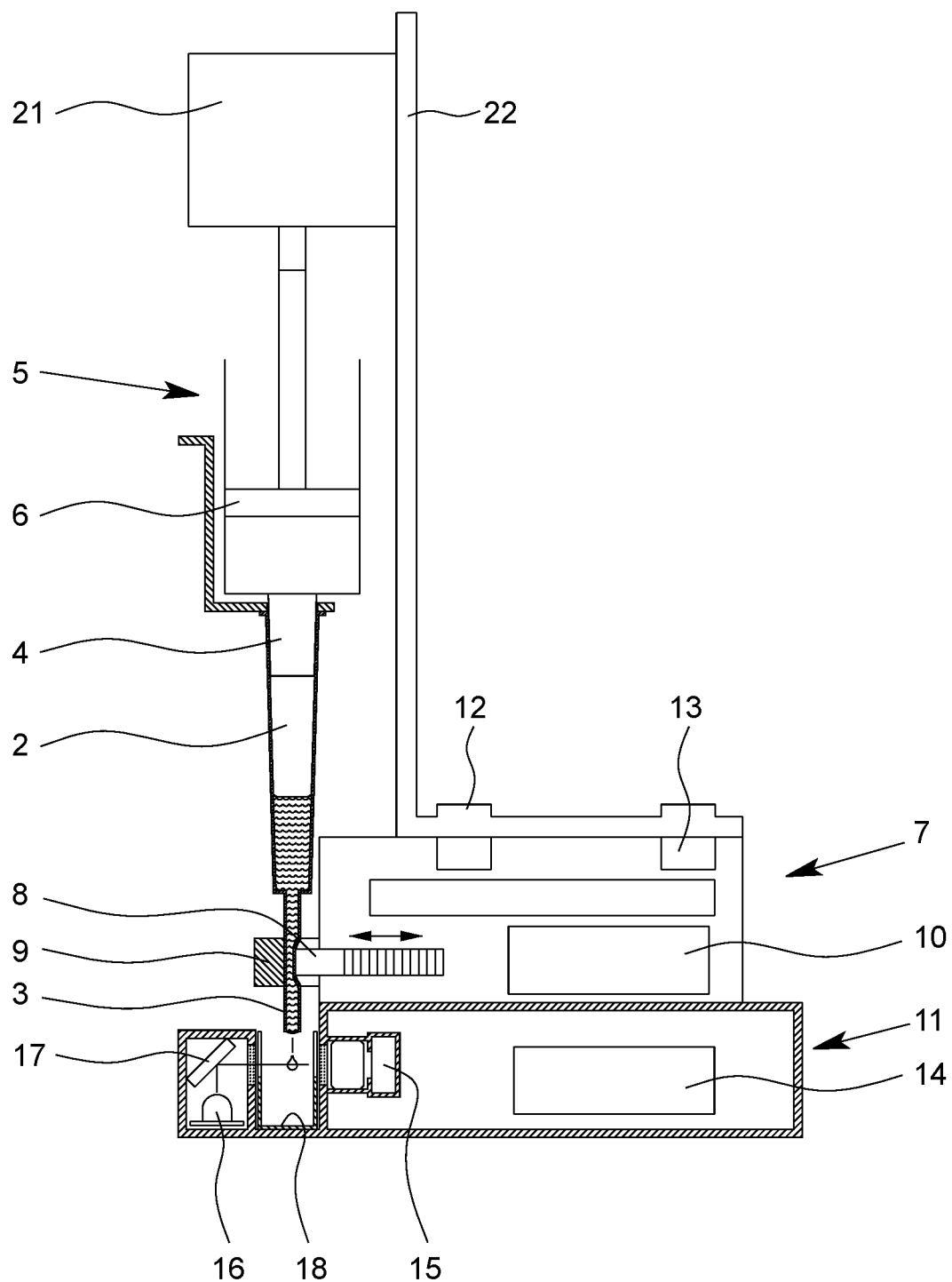
FIG. 5a is a schematic representation of a pipetting device and a micrometering unit in a coupling position during calibration of the micrometering unit, here, for dispensing of the liquid.

Under the mouth opening of the pipette tip 2, a vessel 18 is exchangeably arranged in the base station 11. The liquid is then intended to be dispensed into the vessel 18. For this purpose, the micrometering unit 7 is put into operation (FIG. 5a). With a back-and-forth movement of the actuator 8, force is exerted radially on the expulsion end 3 of the pipette tip 2 that is designed as an elastically deformable tube and fixed on one side by the abutment 9, so that it is deformed. As a result, liquid is dispensed in droplet form from the mouth opening of the pipette tip 2 into the vessel 18, which corresponds to method step f).

The movement of the actuator 8 is indicated in FIG. 5a by a double-headed arrow. It takes place back-and-forth against the abutment 9. That is the initial conditioning of the pipetting device in preparation for the actual dispensing of the liquid. After this first conditioning of the pipetting device, the calibration according to the invention is performed.

In FIG. 5a, a single channel of the piston-stroke pipette 1 is depicted, and the droplet expelled according to method step f) is detected here by a camera 15 aligned radially with the expulsion end 3 of the pipette tip 2 in the image section of the camera. Furthermore, in this method step g), the data of the detected image are transmitted to the control device 14 of the base station 11 as a component part of the pipetting device and/or to some other control device of the pipetting device.

In the following method step h), the control device determines the volume value of the droplet concerned under the assumption of a rotational symmetry of the droplet. The volume value may be determined by various methods. On the one hand, the respective control device compares reference images with the image of the droplet. The volume value of the droplet is determined by the reference image found to be suitable. On the other hand, the control device defines the contour of the droplet and calculates its surface area. Also, in a combination of both methods, the volume value may be determined by means of comparison of the values.

The control device compares the volume value determined in method step h) with a setpoint volume value in method step i). Depending on the volume deviation thereby determined, the actuator 8 assigned to the channel concerned is adjusted in the direction of an approach to the setpoint volume value. Method steps f) to i) are repeated for each channel and, when doing so, the volume values successively determined for the channel are accumulated.

Depending on the approach of the repeatedly determined volume value and the number of repetitions and also prescribed values, such as the nominal volume of the pipette tip 2, a sequence volume dependent on the drive 21 and a residual volume in the pipette tip 2, three different sequences may furthermore be run in the software-controlled control device. Depending on what is prescribed, the different sequences may also be combined.

In method step j1), the accumulated volume value is compared with a sequence volume value prescribed in the control device. As soon as the accumulated volume value in a repetition has approached the sequence volume value to within a difference in volume which is smaller than the volume value last determined, or has reached the sequence volume value or exceeded it for the first time, the repetition for the channel concerned is ended in method step k1). Method step k1) ends altogether when all of the channels have achieved this criterion.

Figure 5B:
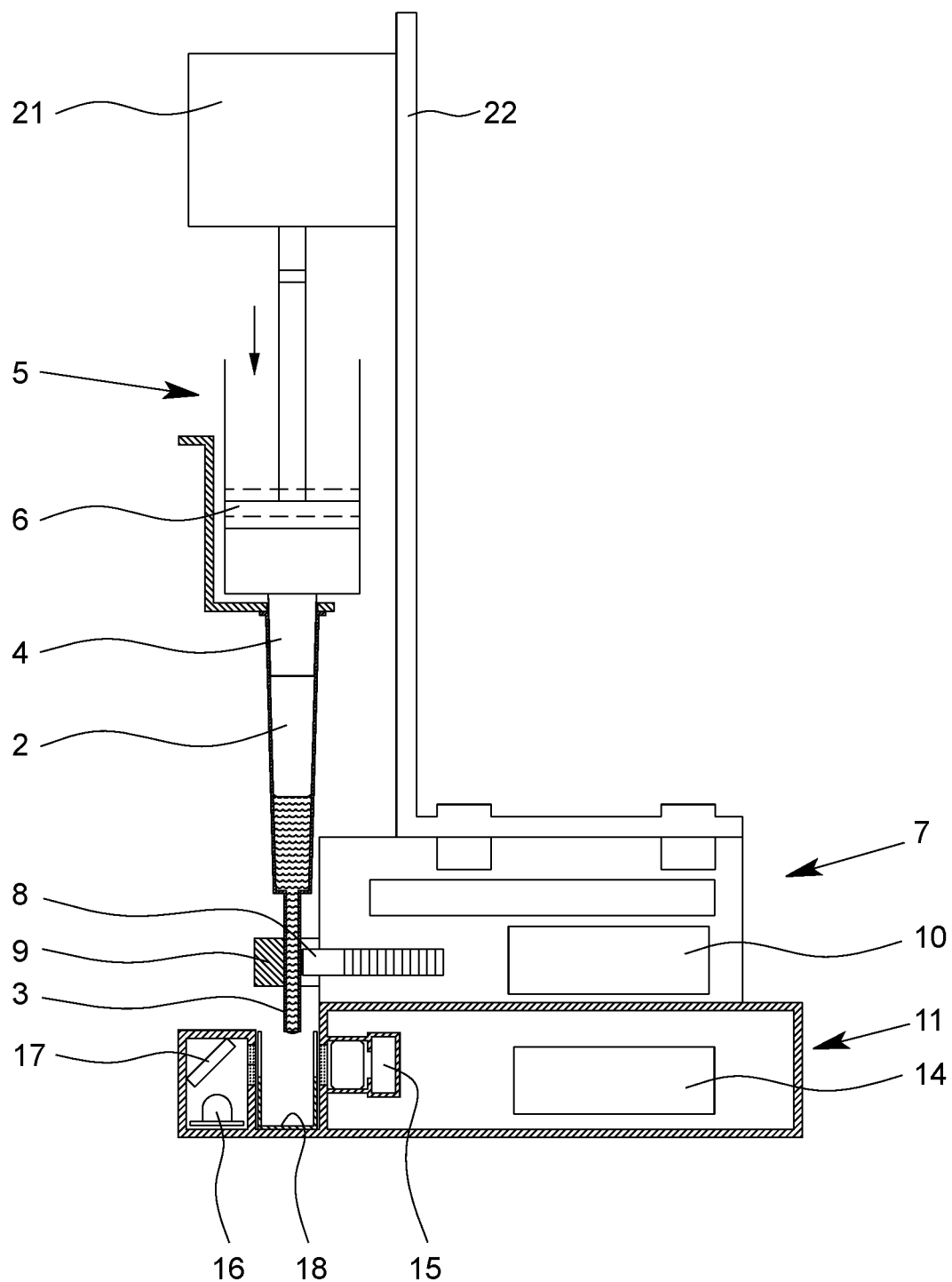
FIG. 5b is a schematic representation of a pipetting device and a micrometering unit in a coupling position during the calibration of the micrometering unit, here, for adjusting of the piston.

After method step k1), for the channel concerned, the piston 6 of the cylinder-piston unit 5 concerned, activated by the control device, is moved in such a way that the volume of air of the metering chamber is reduced and so the loss of liquid from the pipette tip 2 is neutralized to the extent of the accumulated volume value in the expulsion end 3. FIG. 5b shows this method step l1). It may also be performed for all of the channels simultaneously, all of the pistons being moved in parallel, preferably by a common drive 21, and the air cushion being neutralized by the sequence volume value.

Method steps f) to l1) are repeated in method step m1) until the determined volume value in each channel lies within a prescribed tolerance range around the setpoint volume value or at the longest until all of the accumulated volume values from method step j1) correspond to the liquid volume sucked up in method step c) less a residual volume.

Figure 6:
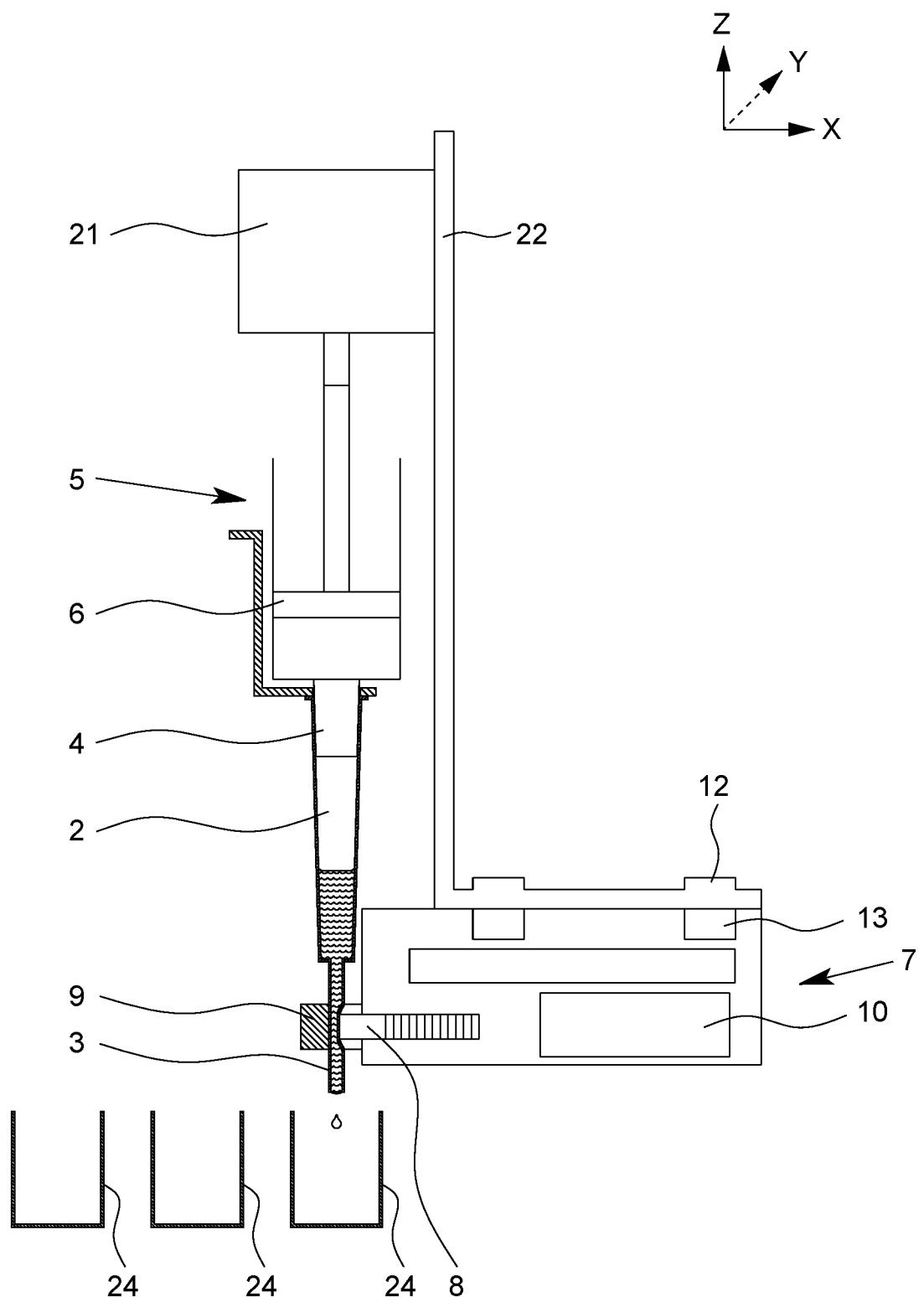
FIG. 6 is a schematic representation of a pipetting device and a micrometering unit metering liquid into target vessels.

In the further optional method step n1), it is determined whether the volume value last determined in method step i) in each channel lies within a prescribed tolerance range around the setpoint volume value. If this criterion is satisfied, after method step l1), droplets are no longer dispensed with the previously achieved setting of the actuators 8 from the pipette tips 2 of the channels, controlled by the control device, into the vessel 18 used for calibration, but into assigned target vessels 24. This takes place either in the coupling position itself or, preferably and as shown in FIG. 6, in a (further) liquid take-up position previously adopted by the piston-stroke pipette 1 together with the micrometering unit 7.

The process described in n1), the dispensing of droplets in the liquid dispensing position, is interrupted when approaching the sequence volume value corresponding to feature k1) and the loss of liquid is neutralized by method step l1).

In another possible sequence there are initially method steps a) to i) in the same way as described above. To this extent, reference may be made to the explanations given above. Beginning with method step j4), method steps f) to i) are repeated for each channel, to be precise until the volume value in the respective channel lies within a prescribed tolerance range around the setpoint volume value. Depending on the channel, the successively determined volume values are then accumulated in method step k4).

The accumulated volume values of the channels are compared in the following method step l4). The highest accumulated volume value is determined (m4)). Apart from in the case of the channel with the highest accumulated volume value, method step f) or method steps f) to i) is/are repeated in the case of the other channels until in the respective channel the accumulated volume value corresponds to the highest accumulated volume value already determined to within a difference in volume which is smaller than the last determined volume value of the channel. For the size of the difference in volume, reference may be made to the general comment made above in relation to the residual liquid volume required there.

After method step n), in method step o4) each piston 6 of the cylinder piston unit 5, activated by the control device, is then moved in the dispensing direction in such a way that the volume of air of the metering chamber is reduced and so the loss of liquid from the pipette tip 2 is neutralized to the extent of the accumulated volume value for each channel, the highest accumulated volume value or the mean value of all of the accumulated volume values in the expulsion end 3.

Preferably, yet a further method step may also be realized, specifically method step p4).

After method step l4), droplets are dispensed into assigned target vessels 24 with the previously achieved setting of the actuators 8 from the pipette tips 2 of the channels, controlled by the control device, to be precise in the coupling position or in a liquid dispensing position previously adopted by the piston-stroke pipette 1 together with the micrometering unit 7.

Preferably, the procedure can then continue such that, in method step p4), the dispensing of droplets in the liquid dispensing position is interrupted when approaching the highest accumulated volume value corresponding to feature m4), or a prescribed sequence volume value and the loss of liquid is neutralized by method step o4).

Figure 9:
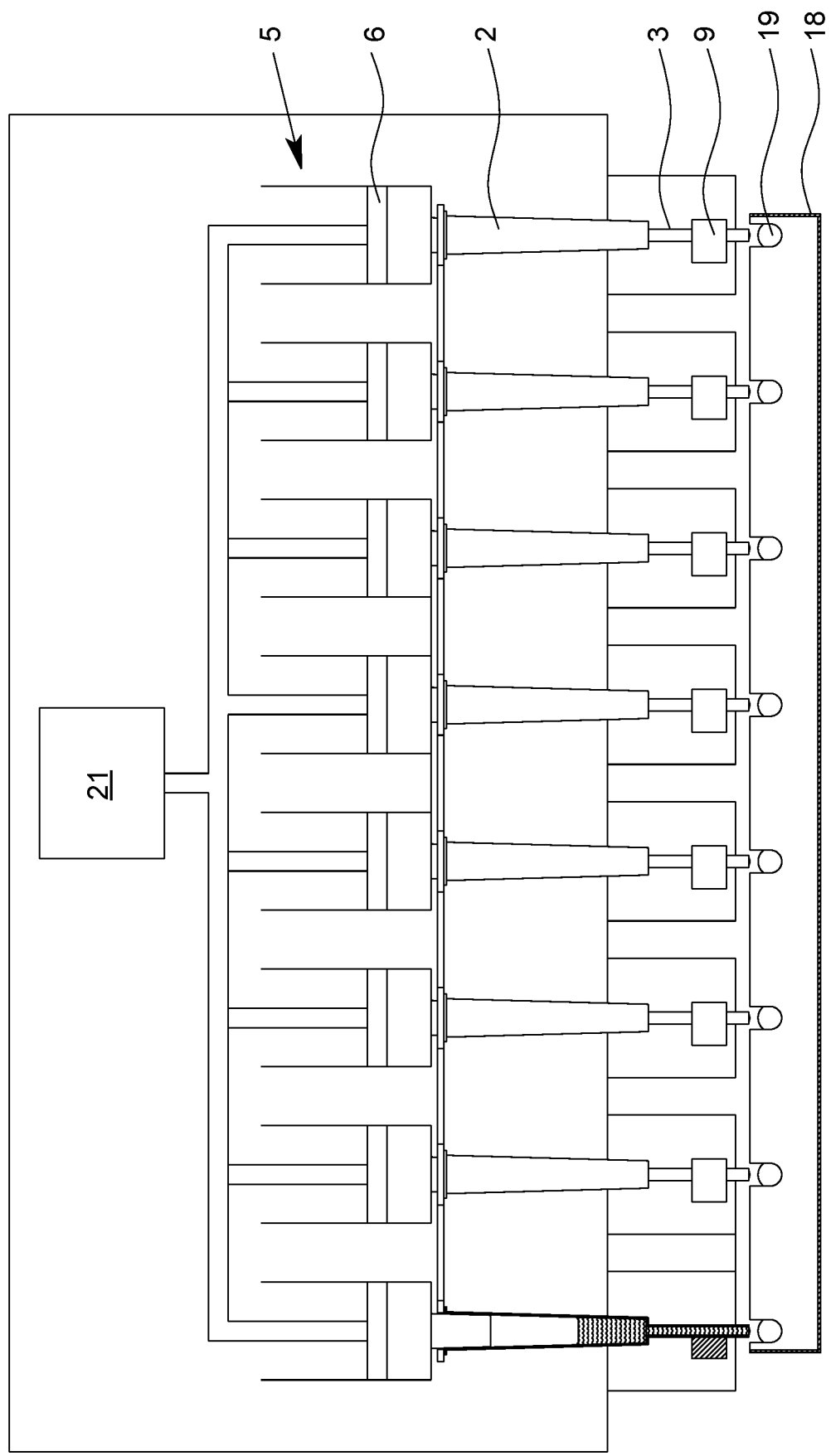
FIG. 9 is a schematic representation of a pipetting device with eight pipette tips arranged in parallel and an eightfold micrometering unit.

Finally, it may be recommended that method step l1) or o4) is carried out for all of the cylinder-piston units 5 simultaneously, in particular by means of a common drive for all of the pistons 6 (FIG. 9).

The already explained method steps a) to i) also apply initially for a third possible way of proceeding, so reference may be made to the explanations given above in relation to the first possible sequence of the method.

For this third variant of a the method according to the invention, beginning with method step j8), method steps f) to i) are repeated for each channel, to be precise until the volume value in the respective channel lies within a prescribed tolerance range around the setpoint volume value. Depending on the channel, the successively determined volume values are accumulated in k8) and the accumulated volume value is compared with a maximum volume value prescribed in the control device, in particular the nominal volume of the pipette tip. The repetitions according to feature k8) are ended in l8) for the respective channel as soon as the accumulated volume value corresponds to the maximum volume value to within a difference in volume which is smaller than the volume value last determined in the case of this channel. After method step l8) for all of the channels, the residual liquid is expelled from all of the pipette tips 2 by means of the cylinder-piston units 6. Method step m8) may take place into the vessel 18 in the coupling position. Alternatively, in m8) the piston-stroke pipette 1 with the micrometering unit 7 is moved to a separate residual volume vessel 25 as shown in FIG. 7. After that, the process is restarted as from method step b) or an input by the user is required.

In an optional further method step n8) the following further procedure can be followed.

If the volume value last determined in method step m8) in each channel lies within a prescribed tolerance range around the setpoint volume value, then, after method step l8), droplets are dispensed into assigned target vessels 24 with the previously achieved setting of the actuators 8 from the pipette tips 2 of the channels, controlled by the control device, to be precise in the coupling position or in a liquid dispensing position previously adopted by the piston-stroke pipette 1 together with the micrometering unit 7.

In an advantageous way, in method step n8), the dispensing of droplets is interrupted when approaching the maximum volume value corresponding to feature l8), or a prescribed sequence volume value and the loss of liquid is neutralized by a method step carried out in a way analogous to method step o4).

The user can prescribe a number of repetitions of method steps f) to i) that brings an end to the setting of the volume value. In an alternative advantageous refinement of the method, depending on the results of the comparison in method step i), method steps f) to l1) or f) to o4) or f) to m8) are repeated up until a switch-off event or point in time, a user input preferably then being required.

In a preferred variant of the method respectively used, it may be provided that method steps j1) and k1) or j4) to n4) or j8) to l8) are not carried out for the channels of the piston-stroke pipette 1 simultaneously, but in a certain sequence one after the other and/or not for all adjacent channels simultaneously, and overall until these method steps have been completed for all of the channels.

The control device is expediently programmed in such a way that, after a change of the liquid and/or after a change of the pipette tips 2, it optimizes itself. In method step g), for this the control device compares various settings. The control device similarly adapts the point in time of the activation of the actuator 8 and/or of a stroboscope light 16 and/or an image query in the sense of an optimum representation and central position of the droplet to be detected in the image section of the camera 15. Preferably, when doing so, or in method step g), the image section is detected as an individual image or is selected as an individual image from a stream of individual images.

The control device can influence various parameters in method step i) for deforming the expulsion end 3 of the respective pipette tip 2. Thus, the following can be adjusted in a suitable way by means of the control device:
- the point in time of the deformation with respect to the image detection in method step g),
- the travel of the stroke,
- the respective dwell time when changing the direction of the stroke,
- the pre-stressing displacement and/or the prestressing force of the deformation of the expulsion end 3,
- at the expulsion end 3, the distance between the deformation and the expulsion opening,
- the angle between the expulsion end 3 and the actuator 8 and/or
- the dynamics of the respective actuator 8, in particular the forward acceleration, forward velocity, return acceleration and/or return velocity, to be precise in dependence on the volume deviation determined in feature i) and/or on the contour or the position of the droplet.

According to the preferred teaching, in method step i) the user prescribes input values to the control device in advance. These values comprise the tolerance range of the setpoint volume value, the sequence volume value, the residual volume, the metered liquid, data on the metered liquid, the parameters of the settable actuator 8 and/or data or algorithms for adjusting the actuator 8 by the control device. The control device preferably only adjusts the respective actuator 8 whenever the volume deviation is greater than the tolerance range. Alternatively or preferably, after the repetition in a corresponding method step, while taking into consideration the approach of the volume deviation to the tolerance range, the actuator 8 is changed or adjusted with respect to a previous method step i).

Preferably, it may also be provided that, before repeating method step j1) or j4) or j8), for each channel the difference between a sequence volume value and a previous accumulated volume value is determined and the difference is accumulated in the next method step j1) or j4) or j8) as a volume value, as determined in method step h).

In a further advantageous refinement, after reaching the coupling position, in method step e), the expulsion end 3 is vertically aligned and for this purpose the assigned actuator 8 of the micrometering unit 7 is movable orthogonally thereto. The actuator 8 begins to interact radially, preferably at right angles, with the expulsion end 3 of the pipette tip 2.

The detection of the image in the image section, defined in method step g) is assisted by a lighting device 16, which is arranged with respect to the camera 15 and illuminates the image section.

The described process that after a certain dispensing of droplets the liquid loss is neutralized is performed with the volume values described or determined. These volume values typically lie between 10 and 2000 nl, in particular between 25 and 500 nl, preferably at approximately 150 nl. The volume of the pressure chamber plays a part in determining the volume values and their smallest value is limited by the smallest possible piston stroke of the cylinder-piston unit.

Overall, a reliable volume of the droplet concerned in each case is determined on the basis of the method according to the invention by using a camera 15. Preferably, the method according to the invention operates thereby in such a way that the volume value of the droplet concerned that is determined by the control device in method step h) is determined by comparison of the image detected in method step g) with a stored reference image and/or the contour of the droplet is calculated from the data of the image detected in method step g). In particular, the control device determines the volume value of the droplet concerned from the volume value of the droplet of the reference image found to be suitable, from the calculated contour of the droplet under the assumption of a rotational symmetry of the droplet or from both.

What is claimed is:

1. A method for controlling a pipetting device for metered liquid with a multichannel, automated micrometering unit, the pipetting device having
    an air-cushion piston-stroke pipette with, for each channel, a cylinder-piston unit with a metering chamber with a volume of air which can be varied by moving the piston and a coupling location which is flow-connected to the metering chamber and on which a pipette tip having a radially elastically deformable expulsion end is mountable,
    a micrometering unit with, for each channel, an actuator which can be set in accordance with at least one parameter and
    an electronic control device,
wherein the piston-stroke pipette is movable into various operating positions, comprising the following method steps:
    a) in a pipette tip pick-up position, coupling a pipette tip at each coupling location of the piston-stroke pipette;
    b) moving the piston-stroke pipette into a liquid take-up position;
    c) in the liquid take-up position, immersing expulsion ends of the pipette tips into liquid which is located in at least one storage vessel, and sucking liquid into the pipette tips by movement of the pistons of the cylinder-piston units controlled by the control device;
    d) moving the piston-stroke pipette into a coupling position;
    e) in the coupling position, coupling the piston-stroke pipette to the micrometering unit in such a way that the expulsion end of each pipette tip is positioned in front of a respective actuator of the micrometering unit;
    f) in the coupling position or in a liquid dispensing position, to which the piston-stroke pipette has been moved together with the micrometering unit, activating the actuators by the control device to individually radially deform each of the expulsion ends of the pipette tips with the respective actuator, so that part of the liquid located in the respective expulsion end is expelled in droplet form,
    g) individually for each channel, detecting the droplet expelled in preceding step f) in an image section of a camera aligned radially with the expulsion end of each pipette tip and transmitting data of a detected image to the control device;
    h) using the control device to determine a volume value of the droplet detected under the assumption of a rotational symmetry of the droplet;
    i) comparing the volume value determined in preceding step h) with a setpoint volume value and, depending on a volume deviation determined from the comparison, the respective actuator is adjusted in a direction toward the setpoint volume value;
    j1) repeating steps f) to i) for each channel and, when doing so, the volume values successively determined for the channel are accumulated and the accumulated volume value is compared with a sequence volume value prescribed in the control device;

k1) the repetitions according to step j1) are ended in the case of the channels for which the accumulated volume value has approached the sequence volume value to within a difference in volume which is smaller than the last determined volume value, or has reached the sequence volume value or exceeded it for the first time;

l1) after method step k1), for the respective channel, moving the piston of the respective cylinder-piston unit, activated by the control device, in such a way that the volume of air of the metering chamber is reduced and so the loss of liquid from the pipette tip is neutralized to the extent of the accumulated volume value or the sequence volume value in the expulsion end; and m1) repeating method steps f) to l1) until the determined volume value in each channel lies within a prescribed tolerance range around the setpoint volume value or at the longest until all of the accumulated volume values from method step j1) correspond to the liquid volume sucked up in method step c) less a residual volume.

2. The method according to claim 1, further comprising step a n1) wherein, if the volume value last determined in method step i) in each channel lies within a prescribed tolerance range around the setpoint volume value, then, after method step l1), droplets are dispensed into assigned target vessels from the pipette tips of the channels, controlled by the control device with the previously achieved setting of the actuators.

3. The method according to claim 2, wherein, in step n1), the dispensing of droplets is interrupted when approaching the sequence volume value corresponding to step k1) and the loss of liquid is neutralized by step l1).

4. Method for controlling a pipetting device for metered liquid with a multichannel, automated micrometering unit, the pipetting device having an air-cushion piston-stroke pipette with, for each channel, a cylinder-piston unit with a metering chamber with a volume of air which can be varied by moving the piston and a coupling location, which is flow-connected to the metering chamber and at which a pipette tip having a radially elastically deformable expulsion end can be coupled, a micrometering unit with, for each channel, an actuator which can be set in at least one parameter, and an electronic control device, wherein the piston-stroke pipette is movable into various operating positions, the method comprising the following steps:

a) in a pipette tip pick-up position, coupling a pipette tip is at each coupling location of the piston-stroke pipette;

b) moving the piston-stroke pipette into a liquid take-up position;

c) in the liquid take-up position, immersing the expulsion ends of the pipette tips into liquid which is located in at least one storage vessel, and sucking liquid into the pipette tips by a movement of the pistons of the cylinder-piston units that is controlled by the control device;

d) moving the piston-stroke pipette into a coupling position;

e) in the coupling position, coupling the piston-stroke pipette to the micrometering unit in such a way that the expulsion end of a pipette tip of each pipette is positioned in front of a respective actuator of the micrometering unit;

f) in the coupling position or in a liquid dispensing position, to which the piston-stroke pipette has been moved together with the micrometering unit, using the control device for activating the actuators and individually radially deforming the expulsion ends of the pipette tips with the respective actuator, so that part of the liquid located in the respective expulsion end is expelled in droplet form;

g) individually for each channel, detecting an image of the droplet expelled in method step f) with an image section of a camera aligned radially with the expulsion end of the pipette tip, and transmitting data of the detected image to the control device;

h) using the control device for determining a volume value of the droplet under the assumption that the droplet has a rotational symmetry;

i) comparing the volume value determined in method step h) with a setpoint volume value to produce a volume deviation value, and depending on the volume deviation value produced, adjusting the respective actuator in a direction toward the setpoint volume value;

j4) repeating method steps f) to i) for each channel, until the volume value in the respective channel lies within a prescribed tolerance range around the setpoint volume value;

k4) for each channel, accumulating the successively determined volume values;

l4) comparing the accumulated volume values of the channels;

m4) determining the highest accumulated volume value of all of the channels;

n4) except for the channel with the highest accumulated volume value, repeating method step f) or method steps f) to i) for the other channels until, in each channel, the accumulated volume value corresponds to the highest accumulated volume value to within a difference in volume which is smaller than the last determined volume value of the channel; and o4) after method step n4), activating each piston of the cylinder-piston unit with the control device so as move each piston in the dispensing direction in such a way that the volume of air of the metering chamber is reduced and so that loss of liquid from the pipette tip is neutralized to the extent of the accumulated volume value for each channel, the highest accumulated volume value or the mean value of all of the accumulated volume values in the expulsion end.

5. The method according to claim 4, further comprising a step p4), after step l4), in which droplets are dispensed into assigned target vessels with the previously achieved setting of the actuators from the pipette tips of the channels, controlled by the control device.

6. The method according to claim 5, wherein, in step p4), dispensing of droplets in the liquid dispensing position is interrupted when approaching the highest accumulated volume value corresponding to step m4), or a prescribed sequence volume value and the loss of liquid is neutralized by method step o4).

7. The method according to claim 4, wherein step l1) or o4) is carried out for all of the cylinder piston units simultaneously.

8. A method for controlling a pipetting device for metered liquid with a multichannel, automated micrometering unit, the pipetting device having an air-cushion piston-stroke pipette with, for each channel, a cylinder-piston unit with a metering chamber with a volume of air which can be varied by moving the piston and a coupling location, which is flow-connected to the metering chamber and to which a pipette tip having a radially elastically deformable expulsion end can be coupled, a micrometering unit with, for each channel, an actuator which can be set in accordance with at least one parameter and an electronic control device, wherein the piston-stroke pipette is movable into various operating positions, the method comprising the following steps:

a) in a pipette tip pick-up position, coupling a pipette tip at each coupling location of the piston-stroke pipette;

b) moving the piston-stroke pipette into a liquid take-up position;

c) in the liquid take-up position, immersing the expulsion ends of the pipette tips into liquid which is located in at least one storage vessel, and sucking liquid into the pipette tips by a movement of the pistons of the cylinder-piston units controlled by the control device;

d) moving the piston-stroke pipette into a coupling position;

e) in the coupling position, coupling the piston-stroke pipette to the micrometering unit in such a way that an expulsion end of each pipette tip is positioned in front of a respective actuator of the micrometering unit;

f) in the coupling position or in a liquid dispensing position, activating the actuators by the control device and individually radially deforming the expulsion ends of the pipette tips are by the respective actuator so that part of the liquid located in the respective expulsion end is expelled in droplet form;

g) individually for each channel, detecting an image of the droplet expelled in method step f) by an image section of a camera aligned radially with the expulsion end of the pipette tip and transmitting data of the detected image to the control device;

h) determining with the control device a volume value of the droplet based on an assumption that the droplet has rotational symmetry;

i) producing a volume deviation value from a comparison of the volume value determined in method step h) with a setpoint volume value and, depending on the volume deviation value produced, adjusting the respective actuator in a direction toward the setpoint volume value;

j8) repeating method steps f) to i) for each channel until the volume value for the respective channel lies within a prescribed tolerance range around the setpoint volume value;

k8) for each channel, successively determined volume values are accumulated and the accumulated volume value is compared with a maximum volume value prescribed in the control device;

l8) ending the repetitions according to feature j8) for the respective channel as soon as the accumulated volume value corresponds to the maximum volume value to within a difference in volume which is smaller than the volume value last determined for the channel; and m8) after method step l8), for all of the channels, expelling residual liquid from all of the pipette tips by means of the cylinder-piston units and restarting the process from method step b) or requiring user input.

9. The method according to claim 8, further comprising a step n8) if the volume value last determined in method step m8) in each channel lies within a prescribed tolerance range around the setpoint volume value, then, after method step l8), dispensing droplets from the pipette tips of the channels into assigned target vessels with the previous setting of the actuators, controlled by the control device.

10. The method according to claim 9, wherein, in step n8), the dispensing of droplets is interrupted when approaching the maximum volume value corresponding to feature l8) or a prescribed sequence volume value.

* * * * *